3,210,351
UNSATURATED TRIAZINE COMPOUNDS
Gaetano F. D'Alelio, South Bend, Ind., assignor, by direct
and mesne assignments, to Dal Mon Research Co.,
Cleveland, Ohio, a corporation of Delaware
No Drawing. Filed Oct. 24, 1962, Ser. No. 233,498
10 Claims. (Cl. 260—248)

This invention relates to derivatives of symmetrical triazine. More specifically, it relates to triazine compounds of the formula

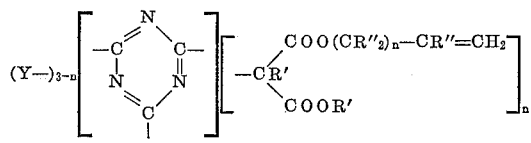

wherein $n$ is an integer having a value of at least 1 and no greater than 3;

$m$ is 0 or 1;

$R'$ is hydrogen or an aliphatic, cycloaliphatic or aromatic hydrocarbon radical of no more than 14 carbon atoms;

$R''$ is hydrogen, halogen or an aliphatic, cycloaliphatic or aromatic hydrocarbon radical of no more than 6 carbon atoms; and Y is a monovalent radical, preferably of the class of hydrogen, halogen, $R'O$—, $R'S$, $R'_2N$— and aliphatic, cycloaliphatic and aromatic hydrocarbon radicals of no more than 14 carbon atoms.

While applicant's copending application, Serial No. 764,251, filed September 30, 1958, issued on November 6, 1962, as Patent 3,062,774, of which this application is a continuation-in-part, discloses and claims polymerization products from a broad class of triazine compounds including certain of the triazine compounds of this invention, the compounds of this invention are suited to various other compositions and uses. For example, they can be used as chemical intermediates, e.g., by addition of halogen to the ethylenic unsaturation to give fire-retardants, inhibitors, rust preventatives, tanning agents, crosslinking agents for polymers, etc.

Compounds of the above structure are referred to hereinafter as triazinyl vinyl compounds or triazine monomers. For purposes of simplicity, the trivalent 1,3,5-triazine, or symmetrical triazine nucleus, is represented herein by $C_3N_3$.

While insoluble and infusible polymers can be made by this invention by using monomers of the above structure having two or more polymerizable groups therein, it is also possible to make soluble, fusible polymers by using monomers of the above structure having only one polymerizable group.

The triazinyl compounds of this invention can be represented by $(M)_n(C_3N_3)(Y)_{3-n}$, in which M represents the radical containing the polymerizable group or groups. As previously indicated hereinabove, when the monomer contains only one polymerizable group, soluble, fusible, polymers are obtained.

To obtain insoluble, infusible polymers, a triazine monomer is used that contains at least two polymerizable groups. The two polymerizable groups, since each M group contains two ester linkages, can be in the same or different M radicals, for example, in a single radical of the structure,

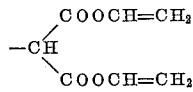

or in two radicals of the structure,

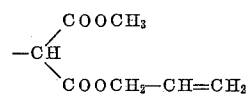

Thus, M can be one, or two, or three, and when M is one or two, the remaining valency or valencies of the triazine ring ($C_3N_3$) are occupied by the radical Y which can be another polymerizable or non-polymerizable radical. For example, Y can be hydrogen and alkyl, aryl, aralkyl, alkaryl, cycloaliphatic and heterocyclic groups and their chloro, fluoro, alkoxy, aryloxy, acyloxy derivatives, such as methyl, ethyl, propyl, isopropyl, butyl, octyl, decyl, chloroethyl, fluoropropyl, cyclohexyl, cyclopentyl, phenyl, chlorophenyl, fluorophenyl, xenyl, naphthyl, tolyl, isopropyl phenyl, benzyl, phenethyl, phenyl propyl, acetoxy benzyl, ethoxy propyl, methyl naphthyl, vinyl, allyl, methallyl, allyl phenyl, etc., radicals. Y can also be hydroxyl and the alkoxy and aryloxy radicals derived from aliphatic, cycloaliphatic, aromatic and heterocyclic hydroxy compounds such as methyl alcohol, ethyl alcohol, isopropyl alcohol, butyl alcohol, isobutyl alcohol, decyl alcohol, phenol, the o-, m-, and p-cresols, the xylenols, naphthols, ethylene glycol, methyl glycol ether, butyl glycol ether, glycerine, pentaerythritol, hydroxy naphthalene, hydroxy pyridine, as well as the alkoxy and aryloxy radicals of hydroxy acids and esters, such as lactic acids, ethyl lactate, salicyclic acid, methyl salicylate; and in addition Y can be an amino group, $NH_2$, or the radical of a mono- or di-substituted amino group, for example, the radicals derived from ethyl amine, methyl amine, butyl amine, nonyl amine, dimethyl amine, aniline, naphthyl amine, ethanol amine, diethanolamine, diisopropanol amine, methyl aniline, piperidine, amino pyridine, hydrazine, symmetrical dimethyl hydrazine, unsymmetrical dimethyl hydrazine, as well as the radicals of the amino-acids, amino-amides, amino-nitriles, specific examples of which are: —$NHCH_2COOCH_3$,

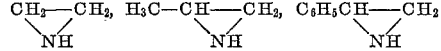

—$NHCH_2CON(CH_3)_2$, —$NHCH_2CN$, —$NHC_6H_4CN$, —$NHC_6H_4NHOCCH_3$; the radicals of semicarbazide and substituted semicarbazides, such as semicarbazide itself, 4-methyl semicarbazide, etc., as disclosed in my U.S. Patent No. 2,295,565, issued September 15, 1942; the guanazo radical which is attached to the triazine ring by reacting dicyandiamide with a hydrazino triazine as shown in my U.S. Patent No. 2,295,567, issued September 15, 1942; the radicals of urea and substituted ureas, such as —$NHCONH_2$, $CH_3NHCONH$—, etc., which may be attached to the triazine ring as shown in my U.S. Patent No. 2,312,688, issued March 2, 1943; radicals of aminoaryl sulphonamides, e.g.

—$NHC_6H_4SO_2NH_2$, —$NHC_6H_4SO_2NHCH_3$ etc., as shown in my U.S. Patent No. 2,312,697, issued March 2, 1943; radicals of acyl hydrazine and substituted hydrazines, such as $CH_3CONHNH$—, $C_2H_5CONHNC_6H_5$—
$C_6H_5SO_2NHNH_2$— etc.; radicals of alkylene amines, such as $\text{CH}_2\text{—CH}_2$, $\text{H}_3\text{C—CH—CH}_2$, $\text{C}_6\text{H}_5\text{CH—CH}_2$
  $\diagdown\!\text{NH}\!\diagup$      $\diagdown\!\text{NH}\!\diagup$         $\diagdown\!\text{NH}\!\diagup$ Y can also be the polymerizable radical of the acrylic, methacrylic, chloracrylic ester or amide of amine alcohols or dialcohols and diamines, e.g.

$CH_2$=$CHCOOCH_2OCH_2O$—

$CH_2$=$CHCOOCH_2CH_2NH$—

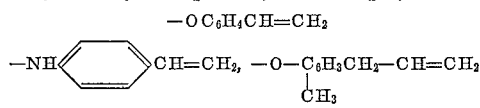

etc.; the radicals of polymerizable aminated or hydroxylated alkylene aryl compounds, for example,

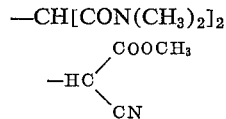

etc.; the radicals of malonic and substituted malonic esters, nitriles and amides, e.g., $—HC—(COOCH_3)_2$, $—HC(COOCH_2CH=CH_2)_2$, $—CH(CN)_2$, $$—CH[CON(CH_3)_2]_2$$

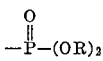

etc.; the

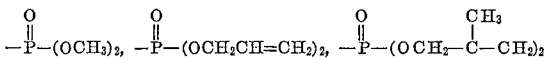

radical, such as

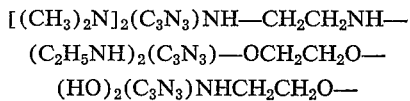

etc., or a triazine ring, e.g., $(CH_3NH)_2C_3N_3—$, or through a bridge, such as $$[(CH_3)_2N]_2(C_3N_3)NH—CH_2CH_2NH—$$

$$(C_2H_5NH)_2(C_3N_3)—OCH_2CH_2O—$$

$$(HO)_2(C_3N_3)NHCH_2CH_2O—$$

etc., or the group can represent the remainder of the molcule, for example, $(M)_n(C_3N_3)—$ in compounds of the structure $(M)_2(C_3N_3)—(C_3N_3)(M)_2$, as well as those structures linked together through carbon atoms, sulfurations, oxygenations, etc., as for example, $$(M)_2(C_3N_3)NHCH_2CH_2NH(C_3N_3)(M)_2$$

$$(M)_2(C_3N_3)NHCH_2CH_2O(C_3N_3)(M)_2$$

$$(M)_2(C_3N_3)OCH_2CH_2O(C_3N_3)(M)_2$$

etc.

Thus, it may be seen that a wide variety of modified polymerizable triazinyl vinyl compounds can be prepared in accordance with the parctice of this invention and this modification is achieved by the nature of the Y radical, which can represent any monovalent radical. However, the most practical purposes are served by the groups indicated above as preferred for Y.

When one of the groups attached to the triazinyl ring contains a polymerizable ethylenic group which is not inhibited by the other atoms and groups in the monomer, then a soluble, or fusible, or soluble-fusible polymer is obtained on polymerizing the monomer. Such monomers can also be copolymerized with other monovinyl or monovinylidene monomers, hereinafter generally referred to as vinyl monomers, such as acrylonitrile, methyl methacrylate, etc., to produce modified thermoplastic compositions.

As disclosed and claimed in applicant's aforementioned copending application, when two or more polymerizable groups are attached to the triazine ring, insoluble, infusible, heat resistant, and in many cases self-extinguishing polymerization products are obtained. It has been further discovered that the triazinyl-vinyl monomers of this invention can be copolymerized with other monoolefinic and polyolefinic monomers to produce any materials having insolubility, infusibility, and heat resistance and valuable and characteristic properties that make them especially suitable for use in industry, for example, in molding, laminating, casting, coating, and adhesive applications, and for other purposes.

In accordance with the disclosure of the aforementioned copending application, homopolymers of these triazinyl vinyl compounds can be produced as well as compositions of matter comprising an interpolymer (copolymer) or interpolymers of at least one triazinyl compound of this invention and at least one other polymerizable compound containing the structures or groupings, $—CH=CH—$, $—CH=C<$, or $CH_2=C<$. More particularly, and as particularly described in the copending application, it has been discovered that the triazinyl vinyl monomers of this invention are especially useful for the preparation of copolymers with unsaturated alkyd resins.

Typical examples of the group $CH_2=CR''—(CR''_2)_n—$ in the general formula of the compounds of this invention include

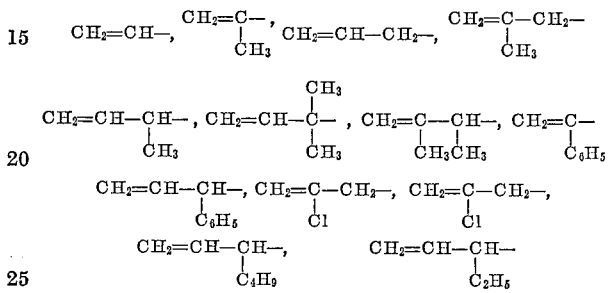

etc. Preferably, because of the ease of polymerizability, $R''$ is hydrogen, as for example, in $CH_2=CH—$ and $CH_2=CHCH_2—$.

$R'$ represents hydrogen, or a saturated or unsaturated monovalent hydrocarbon radical, such as the aliphatic, cycloaliphatic, aryl, aliphatic-substituted aryl, and aryl-substituted aliphatic, etc. radicals, for example, methyl, ethyl, vinyl, propyl, allyl, isopropyl, butyl, methallyl, secondary butyl, isobutyl, butenyl, amyl, isoamyl, hexyl, octyl, crotyl, cyclopentenyl, cyclohexyl, cyclohexenyl, cycloheptyl, phenyl, diphenyl, xenyl, naphthyl, anthracyl, tolyl, xylyl, ethylphenyl, propylphenyl, isopropylphenyl, allyl phenyl, 2-butenyl phenyl, propenylphenyl, tertiary-butylphenyl, methylnaphthyl, benzyl, cinnamyl, phenylethyl, phenylpropyl, etc., as well as aryl, aliphatic-substituted aryl and aryl-substituted aliphatic radicals, wherein one or more of the hydrogen atoms of the hydrocarbon group has been replaced by, for example, halogen, alkoxy, aryloxy, aralkoxy, alkaryloxy, acetoxy radicals, etc., such as chlorophenyl, dichlorophenyl, bromophenyl, dibromophenyl, methoxy phenyl, methoxy naphthyl, acetoxy phenyl, benzoxy phenyl, methoxy ethyl, methoxy butyl, acryloxy ethyl, phenoxy phenyl, etc. Preferably, $R'$ is hydrogen, methyl, or phenyl.

Various methods can be employed to produce the triazinyl vinyl monomers of this invention. One method of preparing these new monomers comprises effecting reaction between a halogenated triazine and MH, wherein M is the radical containing the polymerizable group as indicated above, which reaction is represented as follows, in each case using a hydrohalide acceptor such as sodium hydroxide: $(C_3N_3)Cl_3+3MH \rightarrow (C_3N_3)(M)_3+3HCl$.

When it is desired to modify the monomer by the presence of a Y group, this can be accomplished by first introducing the M group and then introducing the Y groups, for example:

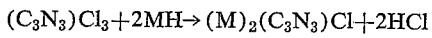

and

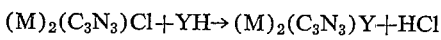

or if the Y group is already attached to the triazine ring, then the M group can be attached as for example:

or the Y group can be introduced first, before introducing the M group, as for example,

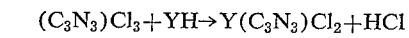

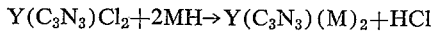

The reaction can be generalized further by the equation $(Y)_{3-n}(C_3N_3)(Cl)_n + nMH \rightarrow (Y)_{3-n}(C_3N_3)(M)_n$, and in the above equations halogen derivatives other than the chloride can also be used, and $n$, M and Y have the same meaning given hereinabove. These reactions can be carried out in an anhydrous liquid medium such as ether, benzene, dioxane, acetone, etc., or in water, or in mixtures of water with water-soluble solvents such as acetone, dioxane preferably in the presence of a hydrohalide acceptor such as sodium hydroxide, potassium hydroxide, sodium bicarbonate, sodium carbonate, pyridine, tributyl amine, etc., and at temperatures from below or about room temperature to temperatures corresponding to the refluxing temperature of the solvent or mixture of reactants.

Illustrative examples of halogenated triazine intermediates that can be used in the preparation of triazine monomers include the following: $(C_3N_3)Cl_3$; $(C_3N_3)Br_3$; $(C_3N_3)I_3$; $HO(C_3N_3)Cl_2$; $HO(C_3N_3)Br_2$; $H_2N(C_3N_3)Cl_2$; $(CH_3)_2N(C_3N_3)Cl_2$; $(C_2H_5)_2N(C_3N_3)Cl_2$;

$CH_3O(C_3N_3)Cl_3$; $C_2H_5O(C_3N_3)Br_2$ $CH_2=CHCH_2O(C_3N_3)Cl_2$

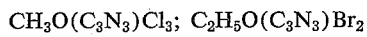

$H(C_3N_3)Cl_2$; $C_2H_5(C_3N_3)Cl_2$; $C_6H_5(C_3N_3)Cl_2$

$CH_3CONHNH(C_3N_3)Cl_2$ $C_2H_5CONHCH_2CH_2NH(C_3N_3)Cl_2$ $C_3H_7COOCH_2CH_2O(C_3N_3)Cl_2$; $(CH_3O)_2PO(C_3N_3)Cl_2$; $(CH_2=CHCH_2O)PO(C_3N_3)Cl_2$; $ClC_6H_4NH(C_3N_3)Cl_2$; $CH_3OC_6H_4NH(C_3N_3)Cl_2$; $CH_3OOCC_6H_4(C_3N_3)Cl_2$; $H_3COOCCH_2NH(C_3N_3)Cl_2$; $H_2NO_2SC_6H_4NH(C_3N_3)Cl_2$;

$CH\equiv CCH_2O(C_3N_3)Cl_2$; $(CH_3O)_2(C_3N_3)Cl$;

$(CH_3HN)_2(C_3N_3)Cl$; $(C_6H_5)(HO)(C_3N_3)Br$;

$[(CH_3O)_2PO]_2(C_3N_3)Cl$; $(ClC_6H_4NCH_3)_2(C_3N_3)I$;

$(CH_2=CHCH_2O)_2(C_3N_3)Cl$.

Illustrative examples of the MH compounds that can be used as intermediates in the preparation of triazine monomers include: $CH_2(COOCH_2CH=CH_2)_2$; $CH_3CH(COOCH_2CH=CH_2)_2$; $CH_2(COOCH=CH_2)_2$;

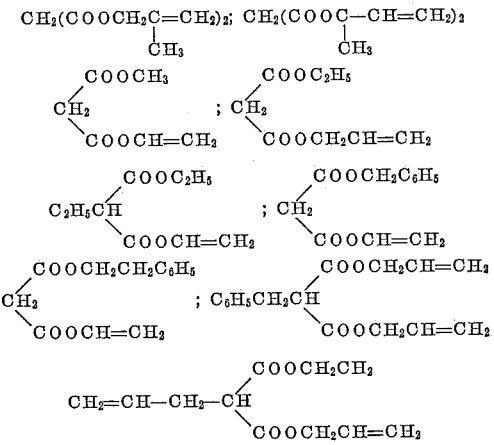

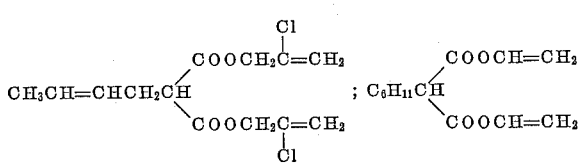

etc.

In these syntheses, the temperature is usually maintained at below 100° C. and the reaction is preferably conducted in the presence of a polymerization inhibitor. Also, the hydrohalide acceptor is preferably an alkali metal first reacted with the malonic ester, e.g.

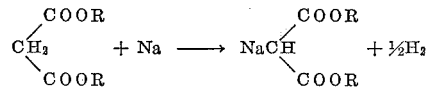

Instead of sodium, lithium, potassium, cesium, and the like can be used.

These intermediates can be prepared by various methods reported in the literature for replacing the halogen atoms in halo triazines, such as cyanuric chloride, with various groups such as hydrocarbon groups, alkoxy, aryloxy, substituted amino groups, mercapto, alkylthio, hydroxy, hydrogen, etc. By using the appropriate reagents with such halo-triazines, the various intermediates desired for preparing the compounds of this invention can be prepared following the procedures taught in the following references.

For introducing $NR'_2$ groups:

Thurston et al., Journ. of American Chemical Soc., 73, 2981 (1951);
Thurston et al., Journ. of American Chemical Soc., 73, 2992 (1951);
Cuthbertson et al., J. Chem. Soc., 1948 561;
Diels et al., Ber., 36, 3191 (1903);
Friedheim, J.A.C.S., 66, 1775 (1944);
Pearlman et al., J.A.C.S., 70, 3726 (1948).

For introducing hydrocarbon-oxy groups:

Dudley et al., J.A.C.S., 73, 2986 (1951);
Diels et al., Ber., 36, 3191 (1903);
Hoffman, Ber., 19, 2061 (1886);
D'Alelio, U.S. Patent 2,295,562;
Schaefer et al., J.A.C.S., 73, 2990 (1951).

For introducing hydroxy groups:

Klason, J. prakt. Chem. (2), 34, 152 (1886);
Finger, J. prakt. Chem. (2) 75, 103 (1907).

For introducing sulfide and mercapto groups:

Klason, J. prakt. Chem. (2), 34, 152 (1886);
Hoffman, Ber., 18, 2196 (1885);
Ciba British Patent 318,275 (1930);
D'Alelio et al., U.S. Patents 2,295,561 and 2,295,562.

For introducing hydrocarbon groups:

Hentrich et al., U.S. Patent 1,911,689;
Ostrogovich, Chem. Ztg., 36, 738 (1912);
Kracker et al., U.S. Patent 2,273,115.

For introducing hydrogen:

Ber., 32, 691 (1899);
Hirt et al., Helv. chim. Acta, 33, 1365 (1950).

This invention will be more fully described by the following examples. The invention is not to be regarded, however, as restricted in any way by these examples and they are to serve merely as illustrations. In these examples, as well as throughout the specification, "parts" and "percentages" shall mean parts by weight and percentages by weight unless specifically provided otherwise.

EXAMPLE I

*Preparation of triazine monomers*

In a reactor equipped with means for reflux and distillation are mixed 470 parts of tris-alpha-dicarbmethoxymethyl)-1,3,5-triazine, $C_3N_3[CH(COOCH_3)_2]_3$, 750 parts of allyl alcohol, 5 parts of tertiary butyl catechol, 3 parts of toluene sulfonic acid. The reaction mixture is refluxed at a temperature which allows methyl alcohol to distill from the reaction mixture. The reflux is continued until no more methyl alcohol is liberated. The catalyst is neutralized with aqueous sodium bicarbonate and the excess alcohol is then removed under reduced pressure. The monomer is then washed with water, dissolved in benzene, and dried with anhydrous sodium sulfate, which is subsequently removed by filtration. The ester product is recovered from the benzene solution by distillation and has the formula $C_3N_3[CH(COOC_3H_5)_2]_3$. Ultimate analyses for carbon, hydrogen, nitrogen, and a molecular weight determination give values of 57.6%, 5.18%, 6.74%, and 625.8, respectively, all of which are in close agreement with the theoretical values.

Replacement of the allyl alcohol by methallyl alcohol, chlorallyl alcohol, etc., produces the corresponding ester. By terminating the refluxing when the appropriate amount of methanol has been distilled, any number of allyl groups less than six can also be substituted in the compound.

By using $$(C_4H_9)_2N-C_3N_3[CH(COOCH_3)_2]_2$$

in the above procedure, the corresponding monomer $$(C_4H_9)_2N-C_3N_3[CH(COOCH_2CH=CH_2)_2]_2$$

is obtained, which, on analyses gives values of 60.4% carbon, 6.96% hydrogen, 9.63% nitrogen; and a molecular weight of 570.2, all of which values are in close agreement with the theoretical values.

Instead of using the esters in an ester-exchange reaction, the free-acids can also be used; thus by using

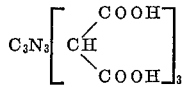

instead of

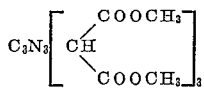

with the unsaturated alcohol, e.g., allyl or methallyl alcohol, an esterification catalyst, such as toluene sulfonic acid, and an azeotroping agent, such as toluene, in a continuous esterification apparatus, the corresponding ester is obtained which corresponds to product obtained by the ester-exchange reaction. By using a half-ester, e.g.;

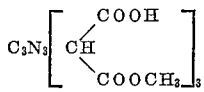

and esterifying the carboxylic group, there is obtained

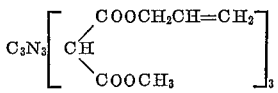

which on analyses gives values of 52.2%, carbon, 3.86% hydrogen, 7.68% nitrogen, and a molecular weight of 550.1, all of which are in close agreement with the theoretical values.

In a similar manner is prepared

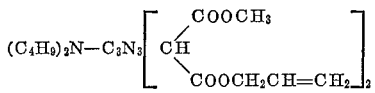

which on analyses gives values of 57.0% carbon, 6.86% hydrogen, 10.47% nitrogen, and a molecular weight of 519.8, all of which values are in close agreement with the theoretical values.

These monomers can also be prepared by reacting 18.4 parts of cyanuric chloride in 100 parts of toluene and 50 parts of toluene containing 60 parts of $$NaCH(COOCH_2CH=CH_2)_2$$

then removing the recipitated sodium chloride, washing with water, drying with anhydrous sodium sulfate, and isolating the monomer from the toluene by distillation.

By these procedures, the various triazine monomers used hereinafter in the Examples are prepared, such as the following having the formulas:

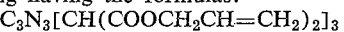
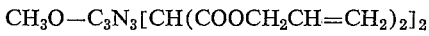
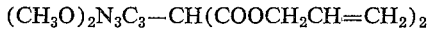
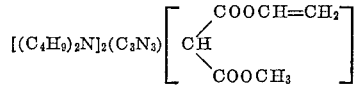
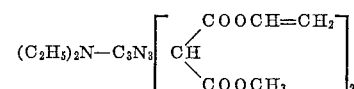
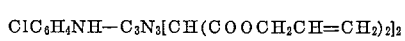
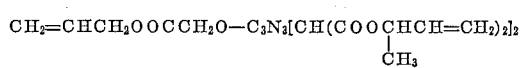
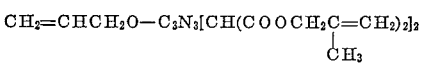
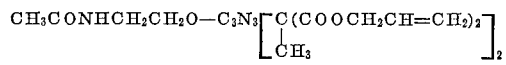
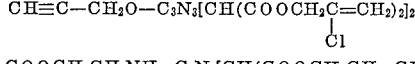
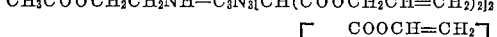
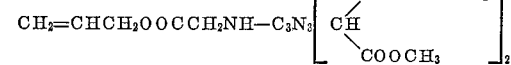
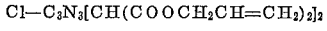
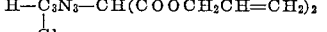
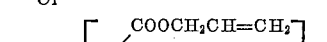
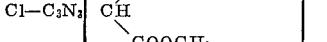
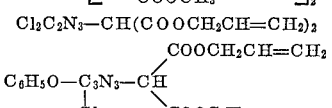
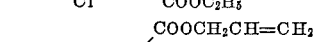
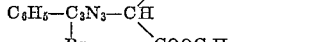
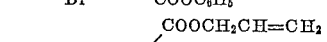
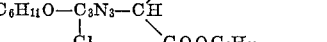

As previously indicated the unsaturated compounds of this invention can also be used as intermediates for the preparation of new compounds which have utility other than in the preparation of polymers. For example, these compounds can be halogenated to produce the chloro or bromo derivatives, etc., as illustrated by the following reaction which is conducted, for example, in carbon tetrachloride:

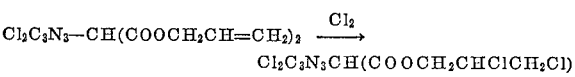

or

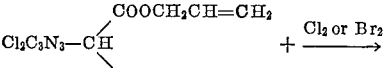

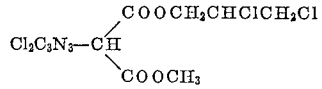

or

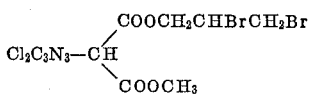

When the monomer has 2 or 3 unsaturated groups the halogenation can be limited by using the appropriate stoichiometric amount of halogen so as to leave one or two such unsaturated groups unhalogenated to give a halogenated product which can be polymerized such as:

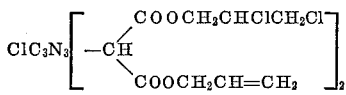

and

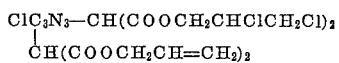

Polymers and copolymers prepared from such unsaturated products have built-in flame resistance. The corresponding compounds in which the unsaturation has been completely halogenated can be used as modifiers for polymers to give plasticity and improve their flame resistance.

The unsaturated compounds of this invention can also be epoxidized with $H_2O_2$ and an acid according to well-known procedures to give compounds such as

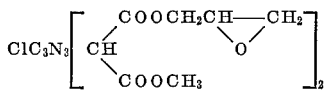

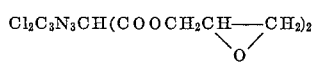

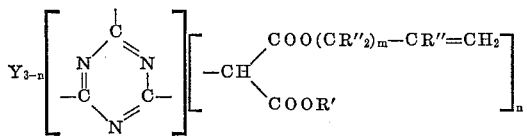

etc.

These epoxidized derivatives can be used as intermediates in the preparation of adhesives and for the preparation of varnishes, paints, etc.

While certain features of this invention have been described in detail with respect to various embodiments thereof, it will, of course, be apparent that other modifications can be made within the spirit and scope of this invention and it is not intended to limit the invention to the exact details shown above except insofar as they are defined in the following claims.

The invention claimed is:

1. A triazine compound of the formula $$\left[Y_{3-n}\left[\begin{array}{c}\text{triazine ring}\end{array}\right]-CH\diagdown_{COOR'}^{COO(CR''_2)_m-CR''=CH_2}\right]_n$$

wherein:

n is an integer having a value of at least 1 and no more than 3;

m is an integer having a value of at least 0 and no more than 1;

R' is a radical selected from the class consisting of hydrogen, vinyl, allyl, methallyl, crotyl, cyclopentyl, cyclopentenyl, cyclohexyl, cyclohexenyl, cycloheptyl, phenyl, diphenyl, xenyl, naphthyl, anthracyl, tolyl, xylyl, ethylphenyl, propylphenyl, isopropylphenyl, allyl phenyl, 2-butenyl phenyl, propenylphenyl, tertiary-butyl phenyl, methylnaphthyl, benzyl, cinnamyl, phenylethyl, phenylpropyl and alkyl hydrocarbon radical, having no more than 14 carbon atoms;

R'' is a radical selected from the class consisting of hydrogen, halogen cyclohexyl, cyclopentyl, phenyl and alkyl radical having no more than 6 carbon atoms; and Y is a radical selected from the class consisting of hydrogen, halogen, R'O—, R'S—, $R_2'N$—, chloroethyl, fluoropropyl, cyclohexyl, cyclopentyl, phenyl, chlorophenyl, fluorophenyl, xenyl, naphthyl, tolyl, isopropyl phenyl, benzyl, phenethyl, acetoxy benzyl, ethoxy propyl, methyl naphthyl, vinyl, allyl, methallyl, allyl phenyl and alkyl radical of no more than 14 carbon atoms.

2. The triazine compound of the formua:

$$C_3N_3[CH(COOCH_2CH=CH_2)_2]_3$$

3. The triazine compound of the formula:

$$(C_4H_9)_2NC_3N_3[CH(COOCH_2CH=CH_2)_2]_2$$

4. The triazine compound of the formula:

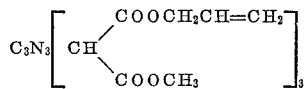

5. The triazine compound of the formula:

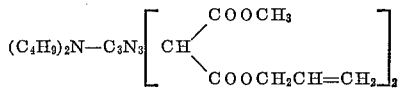

6. The triazine compound of the formula:

$$(CH_3O)_2C_3N_3—CH(COOCH_2CH=CH_2)_2$$

7. The triazine compound of the formula:

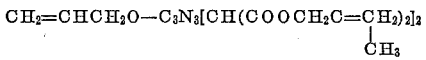

8. The triazine compound of the formula:

$$Cl_2C_3N_3—CH(COOCH_2CH=CH_2)_2$$

9. The triazine compound of the formula:

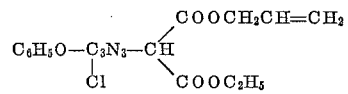

10. The triazine compound of the formula:

$$Cl—C_3N_3[CH(COOCH_2CH=CH_2)_2]_2$$

References Cited by the Examiner

UNITED STATES PATENTS

| | | | |
|---|---|---|---|
| 2,993,877 | 7/61 | D'Alelio | 260—249.5 XR |
| 3,062,774 | 11/62 | D'Alelio | 260—248 XR |
| 3,117,139 | 6/64 | Mooradian | 260—294.3 |

WALTER A. MODANCE, *Primary Examiner.*

JOHN D. RANDOLPH, *Examiner.*